United States Patent [19]

Pellegrino

[11] Patent Number: 4,477,867

[45] Date of Patent: Oct. 16, 1984

[54] CORE SATURATION CONTROL CIRCUIT

[75] Inventor: John Pellegrino, Quincy, Mass.

[73] Assignee: Data General Corporation, Westboro, Mass.

[21] Appl. No.: 564,590

[22] Filed: Dec. 22, 1983

Related U.S. Application Data

[63] Continuation of Ser. No. 297,376, Aug. 28, 1981, abandoned.

[51] Int. Cl.³ .............................................. H02M 3/335
[52] U.S. Cl. ........................................ 363/26; 363/97; 363/56
[58] Field of Search ...................................... 363/22–26, 363/41, 95–98, 133, 134, 55–56

[56]     References Cited
     U.S. PATENT DOCUMENTS

| | | | |
|---|---|---|---|
| 3,859,586 | 1/1975 | Wadlington | 363/56 |
| 4,002,963 | 1/1977 | Hunter | 363/41 X |
| 4,150,424 | 4/1979 | Nuechterlein | 363/56 X |
| 4,150,426 | 4/1979 | Jansson | 363/25 X |
| 4,307,441 | 12/1981 | Bello | 363/97 X |
| 4,322,817 | 3/1982 | Kuster | 363/26 |

Primary Examiner—Peter S. Wong
Attorney, Agent, or Firm—Robert L. Dulaney

[57]     ABSTRACT

A closed-loop core saturation control circuit for use in pulse width modulated power supplies is disclosed. The circuit uses a single transistor as a unity gain, low impedance track and hold amplifier to sense the current in the primary winding of the transformer and supply a related voltage to the power supply comparator, where it sums with the linear ramp voltage. The on-times of the switching transistors are therefore individually controlled and varied such that both switching transistors will see substantially equal peak currents.

6 Claims, 4 Drawing Figures

CORE SATURATION CONTROL CIRCUIT

This is a continuation of application Ser. No. 297,376 filed Aug. 28, 1981, now abandoned.

FIELD OF THE INVENTION

The present invention relates generally to PWM (pulse width modulated) power supplies and more particularly to a closed loop core saturation control circuit for use in a switcher-regulated PWM power supply.

DESCRIPTION OF THE PRIOR ART

Regulated power supplies employ various techniques to achieve regulation. One such technique is pulse width modulation, or PWM. PWM switching power supplies are commonly used to provide DC supply voltages in electronic devices, such as digital computers. A primary component of the power supply is the transformer. Proper operation of the transformer requires that the transformer core not become saturated. Saturation of the transformer core results from a net DC voltage being applied to the transformer windings due to a net difference in the volt-second product of each half-cycle. This difference is typically caused by asymmetry in the operation of the switching transistors due to delays in the various steps of amplification in the power supply. Unless core saturation is prevented, excessive current pulses may result, causing high EMI noise emission, loss of power supply efficiency, and lower reliability due to increased chance of transistor failure.

Several "open loop" methods are commonly used in the prior art to control core saturation. Careful matching of the switching transistors reduces the difference in transistor "on time". To block any DC component of magnetizing current from the primary winding, a capacitor is typically placed in series with the winding. On the secondary side of the transformer, the output rectifiers are usually matched to maintain equal currents and avoid accumulation of magnetic flux in one direction. In addition, the transformer core may be "gapped" to decrease permeability and inductance and increase the proportion of magnetizing current in relation to the load current. The increased proportion of magnetizing current tends to compensate for the DC offset of the circuit.

These techniques have several disadvantages. The requirement for matched components increases the cost of the system. The capacitor adds to system weight and cost, while reducing system reliability. The gapped transformer core is less efficient, requires addition of a sense winding and sensing components, and is a nonstandard part.

A "closed-loop" technique involving sensing of the magnetizing current in the secondary winding and using it to adjust the symmetry of the switching transistor pulses has been attempted in the prior art. Circuits using this technique, however, are complex to design and construct, and impose special constraints on either the electronics or the transformer design which detract from their utility.

Applicant's invention provides a simple closed-loop approach to control of core saturation which is free of the above noted problems.

SUMMARY OF THE INVENTION

The present invention relates to apparatus for control of core saturation in a pulse width modulated power supply. A circuit for implementing the invention includes a track and hold amplifier for monitoring the current in the primary winding of the power supply transformer and for controlling the power supply switching transistors so as to maintain substantially equal peak currents.

It is a further feature that the amplifier includes a transistor and resistive and capacitive components.

It is yet a further feature that the amplifier includes a high frequency current spike filter.

It is an advantage of the present invention that the design will compensate for any imbalances in the primary or secondary portions of the power supply.

It is another advantage of the present invention that components in the primary or secondary portions of the power supply need not be critically matched.

It is yet another advantage of the present invention that a large decoupling capacitor in series with the primary transformer, a gapped transformer core or auxiliary sense windings are not required.

It is a further advantage of the present invention that it can be used with most standard PWM integrated circuit chips without regard to any specific electrical characteristic of the integrated circuit device, such as comparator hysteresis or error amplifier bandwidth.

It is yet a further advantage that the circuit can be analyzed using standard linear models of PWM loops.

DESCRIPTION OF THE PREFERRED EMBODIMENT

Figure 1:
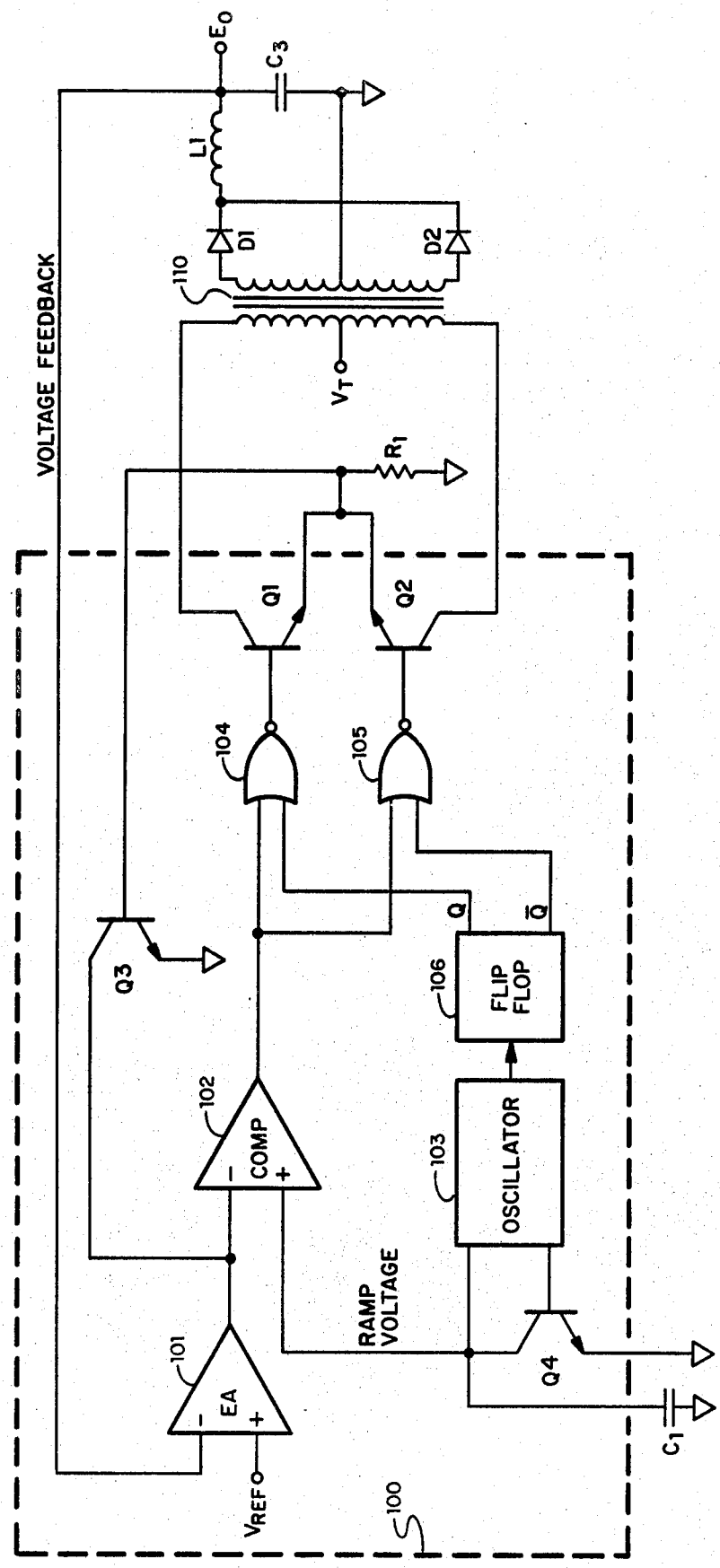
FIG. 1 is a schematic diagram of a prior art PWM power supply.

Referring to FIG. 1 a schematic diagram of a prior art PWM power supply is shown. Circuitry 100 contains the pulse width modulation logic and can be implemented with discrete components or with a commercially available PWM integrated circuit (e.g. SG3524).

Looking now at the interconnection of components, error amplifier 101 receives reference voltage VREF from a reference voltage source (not shown) and output voltage Eo. The output of error amplifier 101 is supplied to the negative input of comparator 102. The positive input of comparator 102 is connected to oscillator 103, capacitor C1, and the collector of transistor Q5. Other outputs of oscillator 103 are connected to the base of transistor Q5 and to the clocking input of flip flop 106. Capacitor C1 and the emitter of Q5 are connected to ground. The Q output of flip flop 106 is supplied to NOR gate 104 and the $\bar{Q}$ output is supplied to NOR gate 105, where they are or'ed with the output of comparator 102. The output of gate 104 is connected to the base of switching transistor Q1 while the output of gate 105 is connected to the base of switching transistor Q2. The emitters of Q1 and Q2 are connected to one end of resistor R1. The other end of R1 is connected to ground. The collectors of Q1 and Q2 are connected to opposite ends of the center-tapped primary winding of transformer 110. The center tap of the primary winding is connected to voltage source VT. The ends of the center-tapped secondary winding of transformer 110 are connected via diodes D1 and D2 to the LC filter formed by capacitor C3 and inductor L1. Capacitor C3 nd the center tap of the secondary winding are connected to ground.

Also, as discussed earlier, one or more of the techniques for controlling saturation of the core of transformer 110 would typically be used, such as core gapping, decoupling capacitors or matched output inductors.

Turning now to the operation of the circuit of FIG. 1, error amplifier 101 compares reference voltage VREF with the voltage feedback signal (Eo) and generates an error signal to the negative input of comparator 102. The positive input receives a linear ramp voltage generated by oscillator 103 and capacitor C1. The slope of the voltage ramp is determined by the size of capacitor C1. Oscillator 103, as discussed below, also provides a narrow clock pulse to flip flop 106 and a reset signal to the base of transistor Q4 at the end of each ramp period. The clock pulse triggers the two outputs of flip flop 106 to alternate states, thus giving flip flop 106 a frequency of ½ the oscillator frequency. The signal to Q4, which is turned off during the ramp period, permits discharging of capacitor C1.

At the beginning of each ramp, the output of comparator 102 will be low since the positive input voltage will be less than the negative input voltage. Therefore either NOR gate 104 or 105, depending on the state of Q and $\overline{Q}$, will have both inputs low. Whichever gate has both inputs low will have a high output and, therefore, either Q1 or Q2 will be turned on, thereby allowing current to flow through the primary winding of transformer 110.

When the ramp voltage from oscillator 103 reaches the level of the error signal from error amplifier 101, the output of comparator 102 goes high causing the output of the NOR gate to go low, thereby shutting off the transistor. No current will flow in the primary of transformer 110 until the start of the next ramp period. The ramp voltage continues to rise until the voltage at the positive input of comparator 102 reaches the oscillator 103 reset level. At that time, oscillator 103 turns on Q5 to discharge C1, thereby dropping the ramp voltage to substantially zero, and sends another clocking pulse to flip flop 106 to change the state of Q and $\overline{Q}$. Whichever NOR gate had been disabled during the prior ramp period because of the presence of a high signal from flip flop 106 will now be enabled and current can flow through the other transistor until the output of comparator 102 again goes high. Current will therefore alternately flow through either Q1 or Q2 at the beginning of each ramp period. The fractional part of the ramp time which Q1 or Q2 is on is controlled by the output of error amplifier 101 to maintain Eo at the desired level.

In this embodiment, current limiting is provided by Q3. If the current through Q1 or Q2 exceeds a maximum level, Q3 will turn on, thereby pulling the negative input of comparator 102 to ground and causing the output of comparator 102 to go high. This will, as explained earlier, cause the transistor to turn off and stop the current flow.

Figure 2:
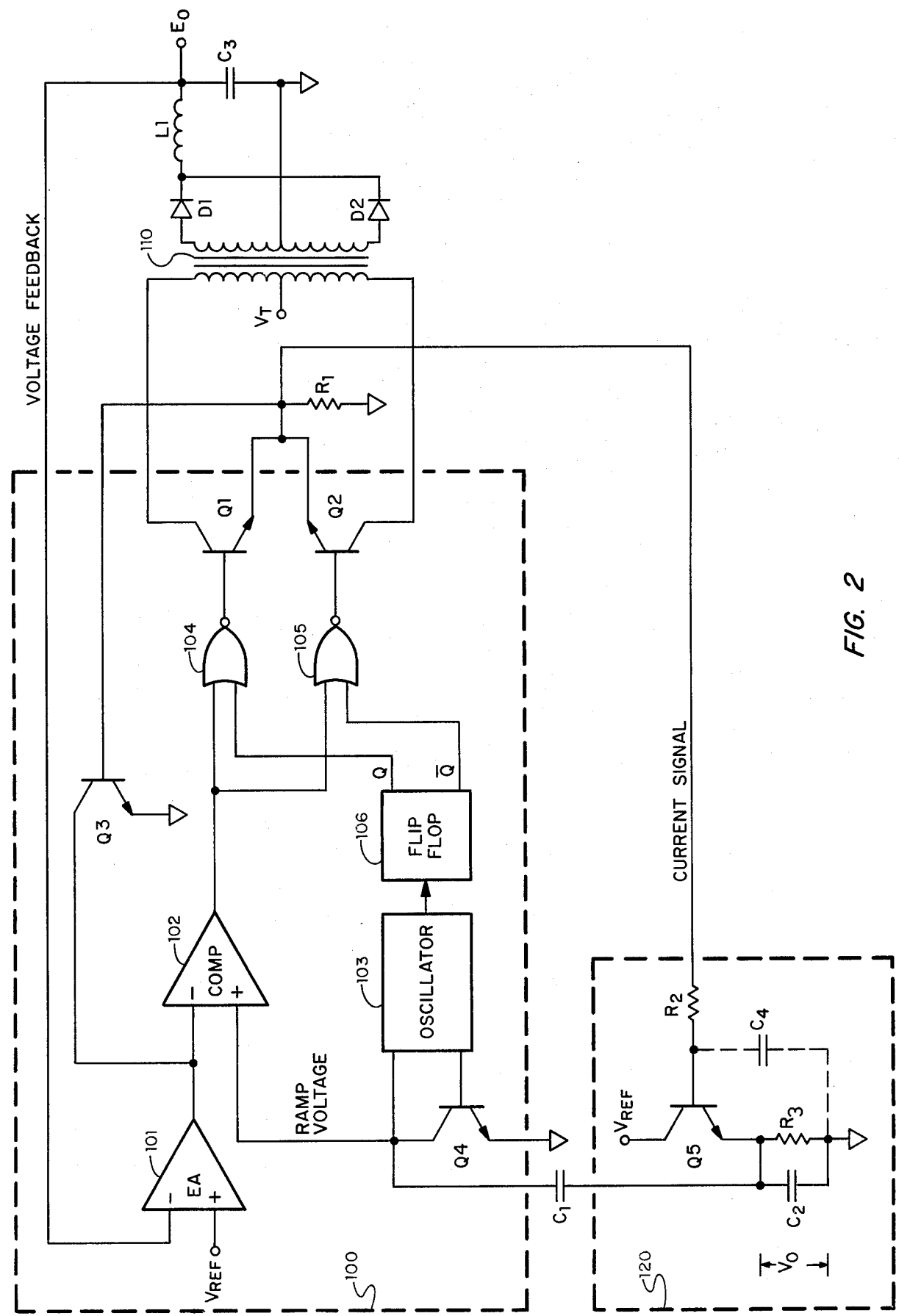
FIG. 2 is a schematic diagram of a PWM power supply incorporating a preferred embodiment of the invention.

Referring to FIG. 2, a PWM power supply incorporating core saturation control logic 120 is shown. Saturation control logic 120 is connected to the emitters of Q1 and Q2 and to C1 and acts as a low impedance track and hold unity gain amplifier which monitors the current signal as sensed by R1 and applies an output in series with the ramp signal from oscillator 103. This provides a current feedback path within the PWM loop.

The current signal from the emitters of Q1 and Q2 is connected to one end of resistor R2, the other end which is connected to the base of transistor Q5. The collector of Q5 is connected to a voltage source, VREF in this embodiment, and the emitter is connected to capacitors C1 and C2, and resistor R3. C2 and R3 are, in turn, connected to ground. Capacitor C4 may be connected between the base of Q5 and ground, if required, as an input filter to eliminate noise between grounds and to filter any high frequency turn-on current spike. To eliminate comparator 102 output "jitter", the value of the time constant of R3 and C2 is chosen such that the total signal to comparator 102 always has a positive slope until the ramp signal is reset.

The current feedback signal will be synchronous with the frequency of oscillator 103 and will add with the linear ramp waveform. This changes the voltage seen at the positive input of comparator 102, thereby modifying the output. This appears as a slight gain reduction of the forward loop. Due to the high DC gain of error amplifier 101, the loop gain change is compensated for in steady state operation by a corresponding shift in the error voltage to the negative input of comparator 102, thereby maintaining regulation of output voltage Eo.

If the currents flowing through Q1 and Q2 are unbalanced, saturation control logic 120 will sense and adjust the ramp signal to comparator 102 such that the on-times of Q1 and Q2 are controlled in a manner which would compensate for and reduce the magnitude of current asymmetry. Logic 120 will, therefore, continuously correct for imbalances or component mismatching in either the primary or secondary circuits of the power supply. No additional reset logic is required, since Q5 will discharge C2 during its normal discharging of C1.

Figure 3:
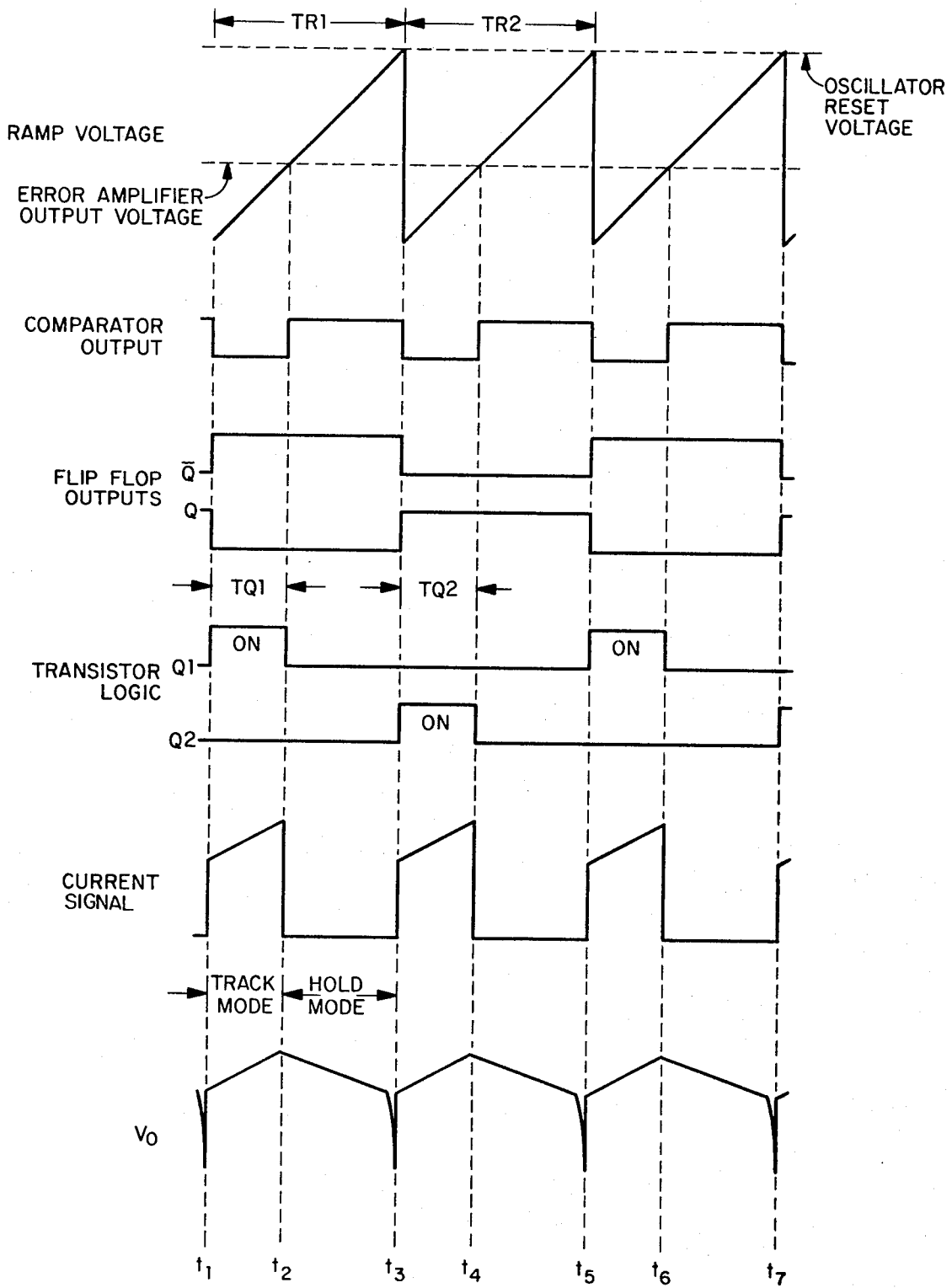
FIG. 3 shows timing diagrams for the power supply of FIG. 2 under balanced current conditions.

Looking at FIG. 3 timing diagrams are shown for balanced currents in the power supply of FIG. 2. At t1, a reset has just been performed and the ramp voltage is approximately zero. Since the ramp voltage is less than the output voltage of error amplifier 101, the output of comparator 102 will be low. Since flip flop 106 output Q is also low at this time, Q1 will be turned on and current begins to flow. At time t2, the ramp voltage equals the output voltage of error amplifier 101. This causes the output of comparator 102 to go high, which turns off Q1.

At time t3, the ramp voltage reaches the reset level of oscillator 103. Oscillator 103 then resets the ramp voltage and voltage Vo via a signal to Q4 and alternates the state of the outputs of flip flop 106. This time $\overline{Q}$ is low, therefore, Q2 will be turned on and will carry the current rather than Q1. At time t4, the output of comparator 102 goes high, turning off Q2 and stopping current flow. At time t5, oscillator 103 again performs its reset and flip flop functions and the cycle repeats. Since the currents are balanced, Q1 on-time TQ1 and Q2 on-time TQ2 are substantially equal.

Figure 4:
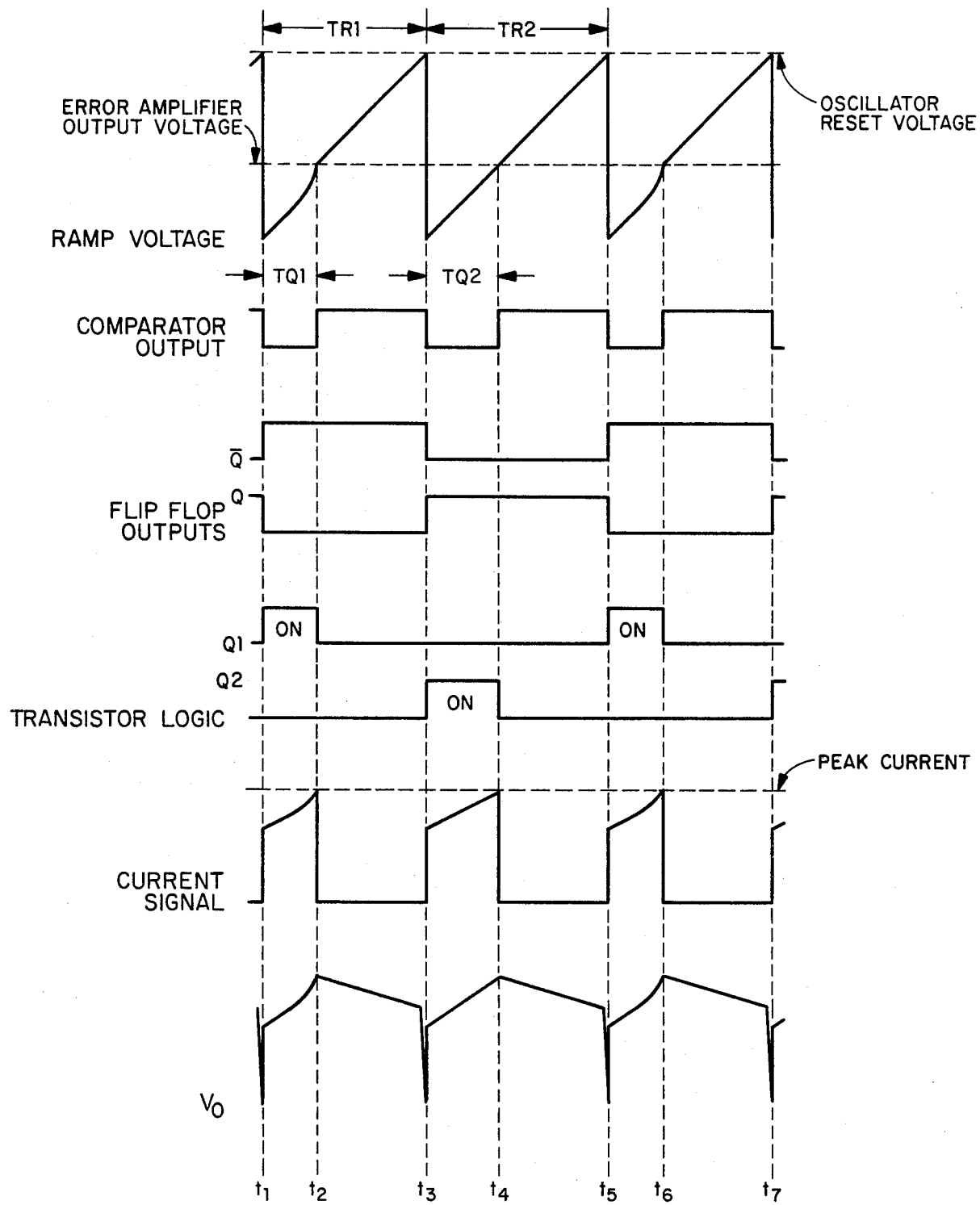
FIG. 4 shows timing diagrams for the power supply of FIG. 2 under unbalanced current conditions.

Looking now at FIG. 4, timing diagrams similar to FIG. 3 are presented. In FIG. 4, however, the currents are unbalanced, as would be the case if the core had become momentarily saturated by a shift in volt-second product. It can be seen that the slope of the current signal is different between Q1 and Q2 and that the peak currents would be asymmetrical if TQ1 and TQ2 are equal. This higher current rate of Q1 is, however, sensed by Logic 120, which increases the slope of the ramp voltage to comparator 102. This causes the ramp voltage to equal the output of error amplifier 101 in a shorter period of time, thereby tending to equalize the volt-second products of Q1 and Q2. That is, Logic 120 manipulates the on-times of Q1 and Q2 by means of modification of the ramp voltage such that Q1 and Q2 have different on-times (i.e. TQ1 does not equal TQ2) to yield substantially equal peak transformer currents, thereby controlling core saturation.

The invention may be embodied in yet other specific forms without departing from the spirit or essential characteristics thereof. For example, the current can be sensed by means other than the sensing resistor, such as with a current sensing transformer or a Hall-effect current sensor. Also, the function of Logic 120 could be performed by a linear amplifier, in either a single-ended or differential configuration, or capacitor C2 may be eliminated if the comparator has sufficient hysteresis such that jitter is avoided at transistor turn-off.

The present embodiments are therefore to be considered in all respect as illustrative and not restrictive. The scope of the invention is indicated by the appended claims rather than by the foregoing description, and all changes which come within the meaning and range of equivalency of the claims are therefore intended to be embraced therein.

I claim:

1. A pulse width modulated power supply comprising:
    means for receiving a reference voltage;
    means for amplifying the error between said reference voltage and the output voltage of said power supply;
    means for repetitively generating a ramp voltage;
    means for comparing said ramp voltage with said amplified error voltage;
    transformer means;
    a first transistor connected such that current flowing through said first transistor will flow through the primary winding of said transformer means in a first direction;
    a second transistor connected such that current flowing through said second transistor will flow through the primary winding of said transformer means in a second direction;
    gate means connected between the output of said comparing means and said transistors;
    means for alternately enabling portions of said gate means such that the output of said comparison means is supplied to only one of said transistors at a time; and
    means for comparing the rate of increase of the current in said primary winding with the rate of increase of said ramp voltage and providing a voltage to said comparing means if the rate of increase of the current in said primary winding exceeds the rate of increase of said ramp voltage, said voltage from said comparing means being added to said ramp voltage, whereby the on-time of each of said transistors is related to the current in said primary winding while said transistor is on, whereby each of said transistors carries a substantially equal peak current.

2. The power supply of claim 1 wherein said comparing and providing means includes means for varying the magnitude of said additional voltage in accordance with the magnitude of the differential between the rate of increase of the current in the primary winding and the rate of increase of the voltage from said ramp voltage source.

3. The apparatus of claim 1 wherein said comparing means comprises a transistor having its base connected to said sensed current, its collector connected to a reference voltage and its emitter connected to said ramp voltage generating means and to a resistor and a capacitor, said resistor and capacitor having their other ends connected to ground.

4. Apparatus for use with a pulse width modulated power supply having a transformer and a pulse width modulator circuit, said circuit having a voltage source for repetitively generating a ramp voltage having a constant slope, an error voltage source, means for comparing said ramp voltage and said error voltage, and a plurality of switching transistors which control current flow through the primary winding of said transformer, said apparatus comprising:
    means for sensing said current in said primary winding and developing a voltage having a known relationship to said current;
    means, coupled to said sensing means and to said ramp voltage source, for continuously comparing the rate of increase of said developed voltage with the rate of increase of the voltage from said ramp voltage source; and
    means for adding additional voltage to the voltage from said ramp voltage source if the rate of increase of said developed voltage exceeds the rate of increase of the voltage from the ramp voltage source.

5. The apparatus of claim 4 wherein said apparatus includes means for varying the magnitude of said additional voltage in accordance with the magnitude of the differential between the rate of increase of the developed voltage and the rate of increase of the voltage from said ramp voltage source.

6. The apparatus of claim 4 wherein said comparing means comprises a transistor connected such that the base is coupled to the signal from said sensing means, the collector is connected to a reference voltage and the emitter is connected to said ramp voltage means, a capacitor and a resistor, said capacitor and said resistor having their other ends connected to ground.

* * * * *